United States Patent [19]

Worrell et al.

[11] Patent Number: 4,637,666
[45] Date of Patent: Jan. 20, 1987

[54] OFFICE FURNITURE DESK TOP WITH ADJUSTABLE CRT CARRIAGE AND TRACKING ARRANGEMENT THEREFOR

[75] Inventors: Williams R. Worrell, Hopkins, Minn.; Robert N. Laroche, Montreal; Michael J. Armstrong, Beaconsfield, both of Canada

[73] Assignee: All-Steel Canada Ltd., Montreal, Canada

[21] Appl. No.: 741,176

[22] Filed: Jun. 4, 1985

[51] Int. Cl.4 ............................................. A47B 17/00
[52] U.S. Cl. ...................................... 312/196; 108/143
[58] Field of Search ............................... 248/1 A-1 H, 248/660, 662, 670, 285, 287, 298, 186, 188.4; 312/196, 7.1, 7.2

[56] References Cited

U.S. PATENT DOCUMENTS

| | | | |
|---|---|---|---|
| 1,623,196 | 4/1927 | Neahr | 248/186 |
| 2,182,703 | 12/1939 | Rainwater | 108/143 |
| 2,292,797 | 8/1942 | Roberts | 108/143 |
| 2,738,245 | 3/1956 | Campbell | 248/186 |
| 3,062,602 | 11/1962 | O'Brien et al. | 108/18 |
| 3,533,586 | 10/1970 | Chichester | 248/188.4 |
| 3,955,788 | 5/1976 | Delage | 248/298 |
| 4,372,629 | 2/1983 | Propst et al. | 312/196 |

FOREIGN PATENT DOCUMENTS

| | | | |
|---|---|---|---|
| 3132015 | 10/1982 | Fed. Rep. of Germany | 108/27 |
| 1553798 | 10/1979 | United Kingdom | |

Primary Examiner—Peter A. Aschenbrenner
Assistant Examiner—Joseph Fack
Attorney, Agent, or Firm—Mann, McWilliams, Zummer & Sweeney

[57] ABSTRACT

An office furniture desk arrangement for providing a CRT work station, in which the desk includes a desk top that along the front of the desk defines a broad and flat work surfacing that extends between the sides of the desk under which a computer keyboard may be retractably mounted, and that along the back of the desk extends a relatively narrow trackway that also extends essentially between the sides of the desk, the upper surfacing of which is in substantial coplanar relation with the desk work surfacing. Underlying the desk top trackway is an easily excessed horizontal trough for concealing electrical wiring, with the trackway shiftably mounting a carriage for movement therealong that includes a rear casing that is roller equipped for riding along the trackway cantilever mounted fashion, and a front casing that is disposed over the desk top work surfacing and is connected to the rear casing for hand adjustment movement by the desk user toward and away from the desk user at the front of the desk. The carriage front casing includes a turntable assembly on which a CRT or the like can be rested and electrically connected through the carriage rear casing to wiring disposed in the trough for connecting same to the computer keyboard and a computer terminal. The CRT resting on the carriage is thus adjustable for desk user convenience toward and away from the user, along the length of the desk work surfacing at its rear, and also can be swivelled.

5 Claims, 5 Drawing Figures

OFFICE FURNITURE DESK TOP WITH ADJUSTABLE CRT CARRIAGE AND TRACKING ARRANGEMENT THEREFOR

The present invention is concerned with office furniture desks, and more particularly, to office furniture desks that are adapted to provide a functional CRT equipped work station.

Office furniture equipped with, or electrically connected to a personal computer, and an associated CRT or other computer output display device, have become popular with the advent of automation to the professional and business world in general. However, the benefits of automation in handling data of any kind do require the personal computer or its equivalent and a readout system for the computer, frequently a CRT or its equivalent, which equipment all too frequently occupies needed work space on the desk top, which detracts from the work space available to the desk user and his station at the front of the desk. Furthermore, the desk designs available that contemplate the use of such equipment therewith seem to be designed from the approach that the desk user must adjust himself to the automation equipment that the desk is equipped with, rather than vice versa with consequent desk user inconvenience and resulting difficulties in accomplishing the work objectives.

A principal object of this invention is to provide an office furniture desk arrangement that is adapted to provide a functional CRT (or its equivalent) equipped work station, that is devised from the standpoint that the desk use is at maximum convenience to the desk user occupying the usual work station position at the front of the desk, insofar as the desk work space on top of the desk and adjustability of automation equipment provided by the desk, are concerned.

Another principal object of the invention is to provide a functional CRT (or its equivalent) work station providing office furniture desk arrangement, in which the desk top provides maximized work space across the front of the desk and between the side edges of the desk, and a trackway arrangement along the rear or back of the desk, equipped with a carriage for a computer output visual display unit, that permits maximum adjustability of same across the length of the desk, forwardly and rearwardly of the desk, and rotationally, to the desk user at the front of the desk.

Yet another principal object of the invention is to provide an automation oriented office furniture desk having a top defining a maximized work surfacing for the desk user occupying the usual or normal user position at the front of the desk, and provides a mounting arrangement for a computer output visual display unit (such as a CRT or its equivalent) that provides for location of the visual display unit over the desk top work surfacing without resting on it, and maximizes the adjustability of the positioning of same, for the desk user's convenience, along the length of the desk, forwardly and rearwardly of the desk, and rotationally or pivotwise, as well.

Still another important object of the invention is to provide, in an automation oriented desk, a desk top trackway and associated carriage arrangement and CRT support therefor, that contemplates maximized sizing adjustability of the carriage support that is to accept, gravity rest fashion, CRT and related equipment of variant sizes and makes, that permits maximized desk user adjustment of the position of the CRT (or equivalent equipment employed) over and along the desk work surfacing with respect to the front of the desk, that permits ready application of and removal from, the CRT (or equivalent equipment employed) with regard to the carriage, and that permits ready hand application of to, and removal from the desk, of the carriage with respect to the desk trackway and at any location along the length of the trackway.

In accordance with the present invention, an office furniture desk adapted to create a functional CRT type work station is provided that includes a generally flat desk top and leg means for supporting same from a floor in a substantially horizontal position; the desk top arrangement itself is provided along its front portion, where the user of the desk is to sit or be stationed, with a wide and flat upwardly facing work surfacing that extends between the sides of the desk and rearwardly of the desk top from its front portion toward the desk rear portion a major proportion of the desk top width, with the desk top also defining along its rear or back portion a relatively narrow trackway that extends substantially between the desk top sides, with the desk top trackway having its upper surfacing in substantially coplanar relation with the desk top work surfacing. Riding on the trackway in accordance with the invention is a carriage that is mounted for movement the length of the trackway, and thus between the side edges of the desk, with the carriage including a rear casing member rotatably mounted on the desk top trackway and a front casing member carried by the carriage rear casing member in overhanging relation to the desk top work surfacing. The carriage front casing is adjustably secured to the carriage rear casing member by telescoping linkage type connectors to provide for rectilinear movement of the carriage front casing forwardly and rearwardly of the work surfacing, with the carriage front casing including a turntable assembly disposed thereon in essentially horizontal position, defining a rotatable platform structure on which the visual read out equipment for a computer, such as a CRT, or its equivalent, may be applied to the carriage by resting same on the turntable platform under gravity.

The adjustable carriage for the CRT or its equivalent is cantilever mounted on the trackway from the rear or back of the desk, and is arranged so that the carriage can be applied to and removed from the desk trackway when the CRT or its equivalent is not on or has been removed from the carriage. The desk trackway is formed to define therealong an elongate rectilinear aperture, with the desk top including a horizontal trough mounted on the underside of the desk top below the trackway for receiving and masking or hiding electrical wiring that is required to connect the CRT or its equivalent to the computer keyboard and other computer components as well as the source of electrical energy involved, with the rear casing including an aperture aligned with the desk top aperture, through both of which the wiring to the CRT or its equivalent extends, whereby such wiring below the desk read out carriage is automatically positioned as needed relative to the CRT or its equivalent as the carriage is moved or adjusted relative to the desk top.

The desk top arrangement provided by the invention makes the desk top work surfacing totally usable by the worker at the front of the desk, with the visual read out equipment of the computer mounted at the rear of the desk, and yet the arrangement involved permits the desk user to bring into easy viewing range, both forwardly and rearwardly of the desk top work surfacing and pivotally or rotationally about a vertical axis. The computer keyboard for the desk is located under the desk top applied to a retractable support assembly for movement between and under the desk retracted position and an exposed operative position at the front of the desk, as the desk user needs to use the computer keyboard.

Other objects, uses and advantages will be obvious or become apparent from a consideration of the following detailed description and the application drawings in which like reference numerals indicate like parts throughout the several views:

However, it is to be distinctly understood that the specific drawing illustrations are supplied primarily to comply with the requirements of the Patent Laws, and that the invention is susceptible of variations and modifications that are intended to be covered by the appended claims.

GENERAL DESCRIPTION

Reference numeral 10 of FIGS. 1-4 generally indicates an office furniture desk arranged in accordance with the basic principles of the invention, comprising a desk top structure or unit 12 including desk top 14 having a front edging 16 where the desk user is seated or stationed, a back or rear edging 18 that is on the opposite side of the front edging 16, and the usual right and left side edgings 20 and 22 that define the ends of the desk 10. The desk top is conventionally supported from the floor by conventional left and right panel legs 13 and 15 (that are shown in phantom).

In accordance with the invention, the desk top 14 is of generally parallel quadrilateral configuration defining along the front of the desk a front downwardly beveled continuous edge surfacing 24 that forms the front perimeter of the wide and flat upwardly facing work surfacing 26 that is of generally quadrilateral configuration and extends the length of the desk top 14. The work surfacing 26 extends rearwardly of the desk top a major proportion of its width, to the rectilinear rear edging 28 of same, with the desk top 14 defining along the back or rear of the desk a trackway 30 that is also rectilinear in configuration and extends the length of the desk top 14, and along the back or rear of same, and extends forwardly of the desk top to adjacent the rear perimeter 28 of the desk top work surfacing 26. The trackway 28 of the illustrated embodiment defines upper surfacings 32 along the lengths of same that are in substantial coplanar relation with the desk top work surfacing 26. The trackway 30 along the rear edging 18 of the desk top defines downwardly beveled continuous edge surfacing 34 that visually complements and has the opposite angulation of the front beveled edge surfacing 24 (see FIG. 4).

Underlying the trackway 30 is a horizontal trough 36 that is adapted to contain and mask the electric wiring with which the desk 10 is associated in providing a CRT (or its equivalent) work station. Mounted in underlying relation to the desk top 14 is diagrammatically illustrated computer keyboard 38 shown for illustrative purposes connected to the underside of the desk by conventional vertical swing pivot mechanism 40 for swinging movement (about a vertical axis 41) of the computer keyboard 38 from the extended position of FIGS. 1 and 2 for operation by the desk user at the front of the desk, and the retracted position indicated in broken lines in FIG. 4, in which the keyboard is disposed in retracted position under the desk top 14. The keyboard 38 may also be pivotally connected to its pivoting support 43 for pivotal adjustment movement about vertical axis 45 (in any suitable manner), for convenience of adjustment by the desk user.

Figure 1:
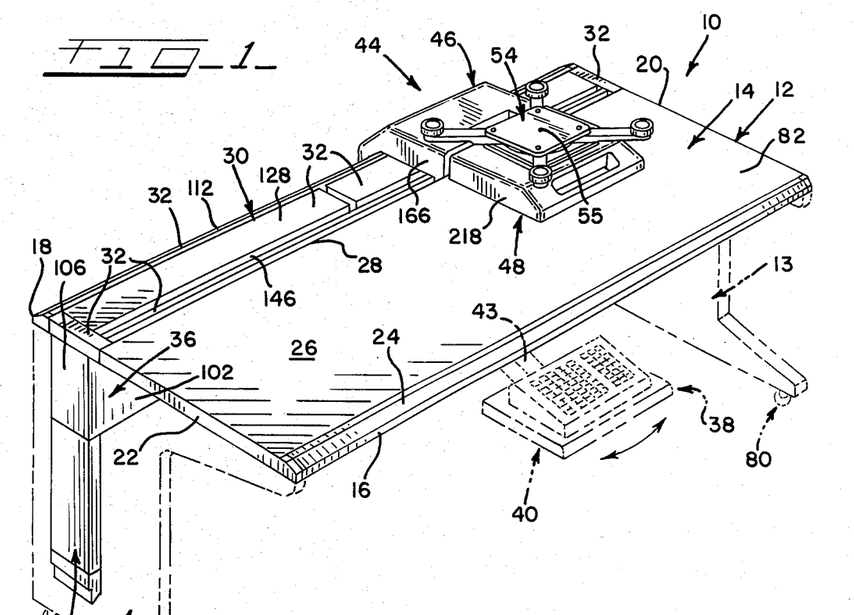
FIG. 1 is a diagrammatic perspective view of one embodiment of the invention, taken from the front side (the side where the worker or desk user normally sits) and left hand end of the desk top, and from above same, with the desk top supporting conventional panel legs being shown in phantom, and a desk top underside computer keyboard conventional mounting arrangement being shown in phantom in the keyboard operating position of same at the front of the desk, and with the desk top computer visual readout support carriage shown in one position of adjustment with respect to the desk top (the computer visual readout equipment involved, such as a CRT, being omitted)
Figure 2:
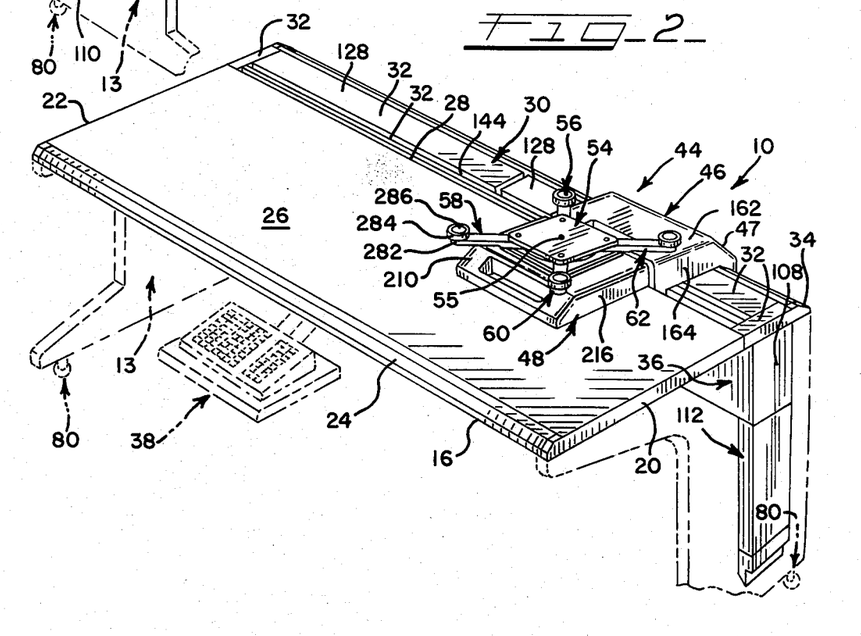
FIG. 2 is similar to that of FIG. 1, but taken from the front and right hand end of the desk top, and above same.
Figure 3:
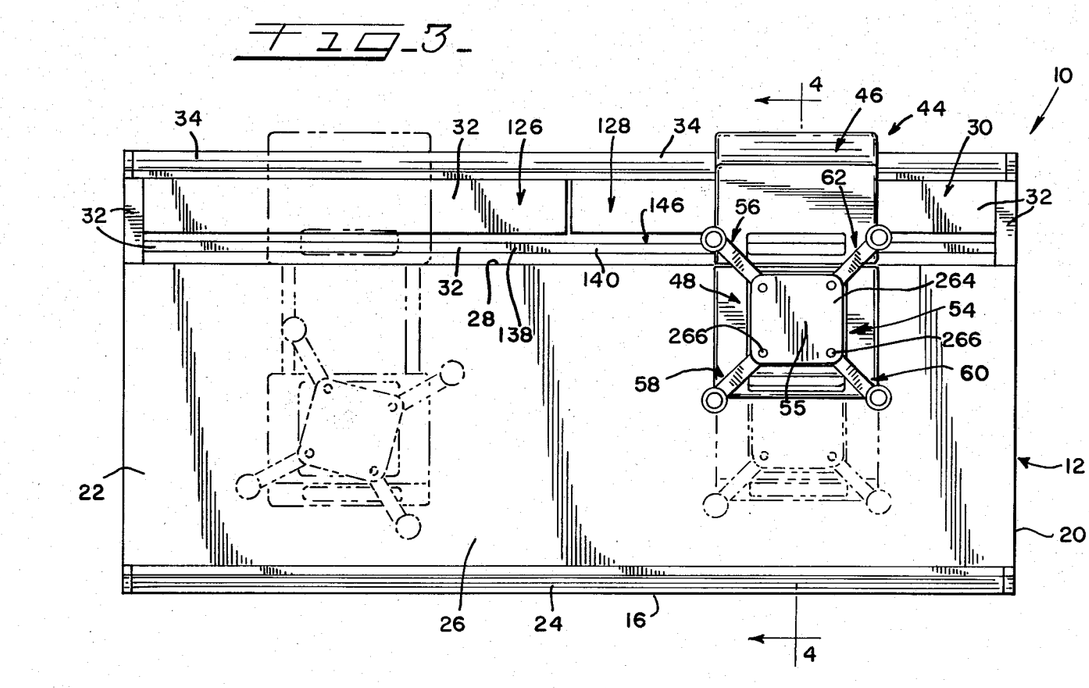
FIG. 3 is a top plan view of the desk top, showing the computer visual display equipment support carriage in full lines, and several variant positions of adjustment of same in phantom.
Figure 4:
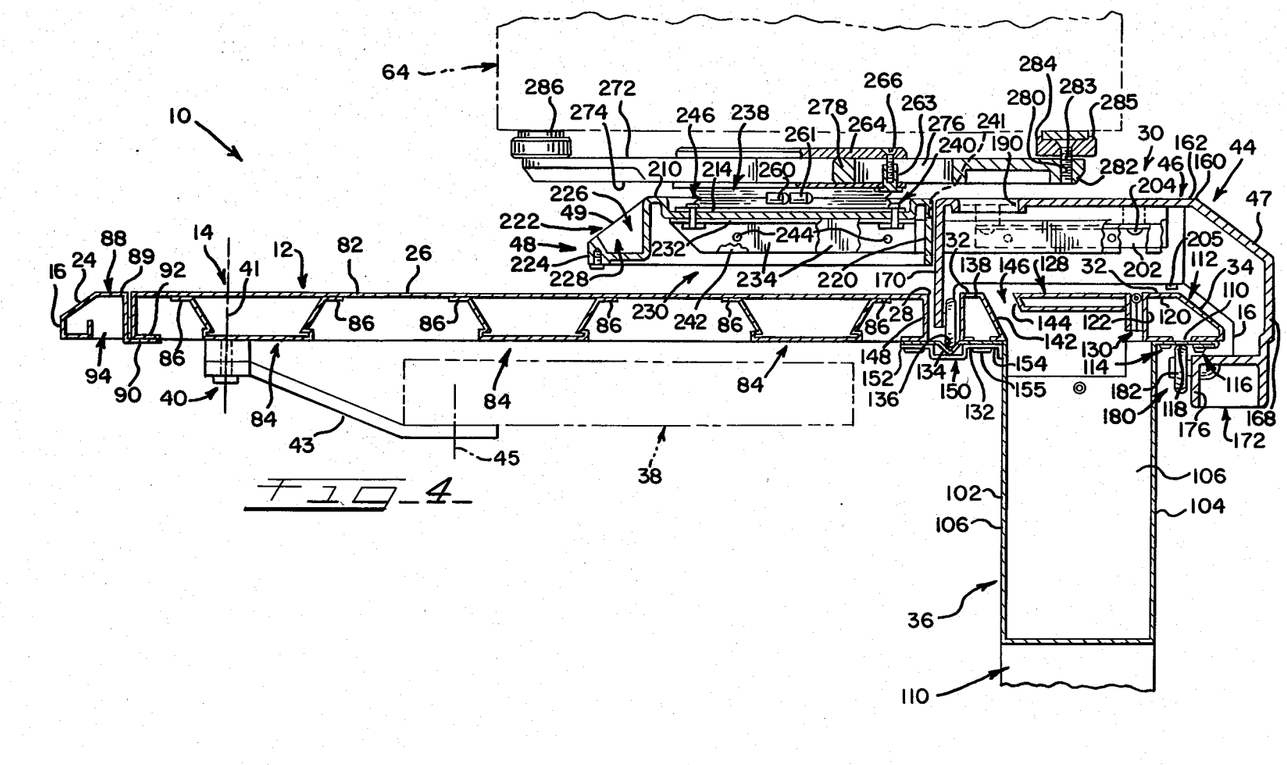
FIG. 4 is a vertical cross-sectional view through the desk top and the computer visual read out display support carriage therefor, as viewed along line 4—4 of FIG. 3, showing also in outline the location of the extendible and retractable computer keyboard assembly underneath the desk top.
Figure 5:
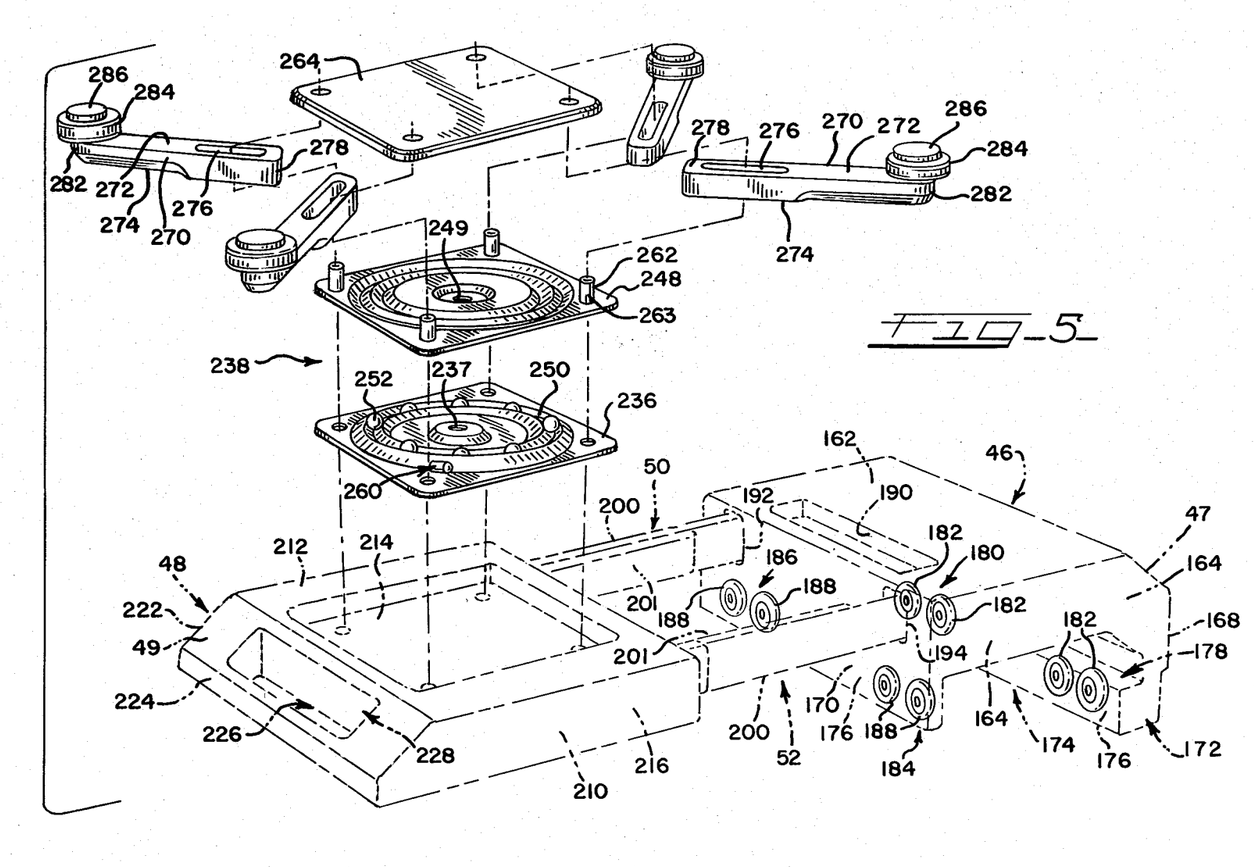
FIG. 5 is a diagrammatic exploded perspective view of the computer visual read out display unit carriage assembly, with the front and rear carriage casings and their telescoping connective slide assemblies being shown in broken line form and the carriage assembly front casing turntable assembly being shown in exploded relation.

Operatively mounted on the trackway 30 is carriage 44 for movement the length of the desk 10, as indicated in FIG. 3, with the carriage 44 itself comprising rear casing 46 that is cantilever mounted on the desk top 14 on the trickway 30 in the manner indicated in FIG. 4, a front casing 48 that is disposed in overlying relation to the desk top 14 (see FIG. 4), and that is connected to and supported by the carriage rear casing 46 by conventional spaced telescoping ball bearing slide assemblies 50 and 52, for movement of the carriage front casing 48 between the extended relation shown in FIGS. 3 and 5 (note the broken line illustrations), and the contracted relation shown in FIGS. 1, 2 and 4. The carriage front casing 48 has operably mounted on same a turntable assembly 54 including a plurality of adjustable support arms 56, 58, 60, and 62 on which a computer visual output display unit, such as a CRT or its equivalent, may be rested for support thereof thereon, as indicated in FIG. 4, wherein a CRT is shown in outline and is generally indicated by reference numeral 64.

The electrical wiring connecting the computer keyboard 38 and the CRT 64 or its equivalent, as well as the wiring connecting same to the computer, computer terminal, and the manner of connecting these components, may be entirely conventional and forms no part of the present invention. The term CRT as employed in this disclosure and appended claims is to have the meaning ascribed to it in the computer arts, and thus means a device having an electronic screen for display of data and images; other terms applied to such devices are, for example, TV, monitor, and video display.

As indicated in FIG. 4, the carriage rear casing 44 defines downwardly beveled edge surfacing 47, while the front casing 48 defines forward downwardly beveled edge surfacing 49. It is a feature of the illustrated embodiment of the invention that the carriage rear casing surfacing 47 complement the rear edging 34 of the desk top 14, and the carriage forward edge surface 49 complement the front edge surfacing 24, for aesthetic purposes.

SPECIFIC DESCRIPTION

The desk top supporting panel legs 13 and 15 that are illustrated may be of any conventional arrangement, such as that disclosed in Beaver U.S. Pat. No. 3,809,449, and secured to the ends of the desk top 14 represented by edgings 22 and 23, by clips and suitable nut and bolt assemblies, as disclosed in said patent. The panel leg assemblies 13 and 15 are conveniently equipped with conventional leveling glides 80 to enable the user to "level" his desk so that the work surfacing 26 is horizontally disposed or essentially so.

As indicated in FIG. 4, the desk top 14 itself comprises a planar sheet 82 reinforced by suitable stiffeners 25 that extend the length of the desk with the sheet 82 having its ends turned over the ends of stiffeners 84 at the ends of the desk and suitably fixed thereto to define the desk side edgings 20 and 22. While the top surfacing defining sheeting 82 and the stiffeners 84 may be provided in various ways, the top sheet 82 is preferably a laminated sheeting of which the work surfacing forming the top surfacing of same is defined by a suitable plastic material that is suitably laminated to an undersheeting of sheet metal, to which the stiffener wings 86 are suitably affixed as by employing spot welding techniques or the like. The top 14 at the front of the desk has fixed to same front edge forming member 88 that is shaped to define a continuation 89 of the work surfacing 26, the downwardly angled edge surfacing 24, and the front side surfacing 16. Member 88 is formed to define under flange 90 that is suitably affixed to the turned under flange 92 of the desk top, as by employing suitable spot welding techniques. The shaping of the member 88 on its underside is arranged to provide hand grip opening 94 that extends along the length of the desk, to permit the user of the desk to appropriately grasp the desk and pull the desk toward him if so desired, sliding the desk as a unit over its floor supporting surface on which glides 80 rest.

The computer keyboard 38, its pivotal connection 40, and its support 43 with which is is associated are suitably mounted on the underside of the desk top 14, and in any suitable manner using conventional components.

The horizontal trough 36 is of elongate quadrilateral transverse cross-sectional configuration (see FIG. 4) comprising a fabricated receptacle 100 including a front side wall 102 and a rear side wall 104 that are joined by end walls 106 and 108. (see FIGS. 1 and 2). Depending from either end of the horizontal trough 36 and suitably fixed thereto are suitable vertical troughs 110 and 112 that provide additional wiring space and also provide rigid means for fixing the respective panel legs 13 and 15 to the desk in any suitable manner.

As indicated in FIG. 4, the horizontal trough 36 underlies the trackway 30 and in the illustrated embodiment the horizontal trough forming front and rear walls are either formed or connected to the rest of the desk top to define the roller rideways that the carriage 44 is rollably mounted on, cantilever fashion.

Thus, the back or rear wall 104 of the horizontal trough includes a rearwardly extending wing 110 that is secured to the fabricated elongate desk top rear member 112 employing screw assemblies 114 and 116 that are disposed in rows extending longitudinally of the desk and spaced apart transversely of the desk so that the wing 110 defines rollerway 118 on the underside of the desk top 14 on which the carriage 44 rides in the manner indicated FIG. 4.

The fabricated member 112 is formed to define the desk top downwardly beveled edging 34 and the desk top rear edging 16 as well as top wall 120 and upright wall 122. The top wall 120 defines the upper surfacing 32 that forms a part of the trackway surfacing which is in coplanar relation with the forwardly located work surfacing 26 of the desk top. The upright wall 122 also supports a pair of covers 128 that are disposed in end to end relation along the length of the desk and are mounted in place by employing suitable leaf hinges 130 (see FIG. 4), that may be of the conventional piano leaf hinge type, so that the covers 128 are normally supported in their horizontally disposed positions indicated in FIG. 4, but swing upwardly and rearwardly of the desk 10 to expose the interior of the trough 36, when the carriage 44 is disposed to one side or free of same, or is removed from the desk.

The forward wall 102 of the trough 36 is formed to define forwardly extending wing 132 along the length thereof, which is downwardly indented as at 134, in a manner paralleling the rollerway 118, to define an upwardly facing rollerway 136 along the length of the desk top 10, that also forms a mounting rideway for the carriage 44, as will be described hereinafter.

In the form shown, an elongate fabricated member 138 is suitably affixed to the wing 132, as by employing spot welding techniques, with the member 138 being formed to define the upwardly facing surfacing 32 thereof that serves the same purposes as surfacing 32 of member 112, and angled wall 142, which, together with the edging 144 of the respective covers 128, define elongate rectilinear gap 146 that is open to the interior of the horizontal trough 36.

Mounted in reinforcing relation to the fabricated member 138 and the rearwardly angled over end portion 148 of the top surfacing defining sheet 82 is the elongate trough member 150 (see FIG. 4) applied along the downwardly indented portion 134 of the horizontal trough forward wing 142, with the trough member defining wings 152 and 154 that are secured in place in any suitable manner to the underturned portion of the sheet 82 and the wing 132, as by employing suitable screw assemblies 155 or the like. The wing 132 and the trough member 140 extend the length of the desk top 10, and the rear end 148 of the sheet 82 and the member 138 are spaced apart for the purpose of adding depth to the rollerway 136, as indicated in FIG. 4.

Turning more specifically to the desk carriage 44 itself, the rear casing 46 comprises a dished housing or shell 160 (see FIG. 5) formed from a suitable metallic material, such as aluminum and defining planar top wall 162, the beveled edge surfacing 47, planar end walls 164 and 166, rear wall 168 and forward or front wall 170, with the rear wall 168 being integral with a depending reinforced shelf structure 172 that extends under the open side 174 of the shell or housing 160 and defines upright wall 176 on which are journalled in coplanar vertical relation two sets 178 and 180 of identical rollers 182 that are to ride on the underside of the trough wing 110, namely in and a long rollerway 118, as indicated in FIG. 4.

The forward or front wall 170 of the shell 160 within the shell 160, relation journals two sets 184 and 186 of rollers which each comprise identical rollers 188 that are also identical to the rollers 182.

As indicated in FIG. 4, the sets of rollers 178 and 180 are in coplanar relation vertically as well as horizontally, with the horizontal level of the individual rollers 182 of the sets of rollers 178 and 180 being below the level of the corresponding sets of rollers 184 and 186. The rollers 188 of the sets of rollers 184 and 186 are also in coplanar relation vertically and horizontally, with their axes of rotation being disposed above the level of the axes of rotation of the respective rollers 182 to provide for the cantilever type mounting of the carriage 44 on the rear of the desk that is contemplated by the present invention, with the rollers 188 of the roller sets 184 and 186 riding in the rollerway 152 that is disposed on the upwardly facing side of the desk top 14.

In the diagrammatic showing of FIG. 5, the carriage rear casing 46 and front casing 48 are shown in broken lines to better bring out such component parts as the sets of rollers 178, 180, 184, and 186 of the rear casing 46.

The shell or housing 160 is also formed so that its top wall 162 defines elongate aperture 190 through which the wiring from the trough 36 to the CRT or its equivalent passes when the CRT 64 or its equivalent is applied to the carriage 44 in the manner indicated in FIG. 4. The aperture 190 also permits an individual to insert one hand therethrough to grasp the carriage 44 for application of same and removal of same to and from the trackway 30, as will be later described.

The housing or shell 160 in its forward wall 170 also defines a pair of windows 192 and 194 through which mentioned commercially available telescoping antifriction slides 50 and 52 extend. Each assembly 50 and 52 includes an outer rigid member 200 of C shaped transverse cross section suitably fixed to the shell or housing 160 inside same, as by being affixed employing suitable attachments to angle members 202 (see FIG. 4) that are in turn secured to the rear casing 46 by suitable fasteners 204, with the members 200 projecting from the respective windows 192, 194 and forwardly of the rear casing 46 a predetermined amount. The assemblies 50 and 52 may be the commercial telescoping slide assembly offered by Waterloo Metal Stamping Ltd. of Kitchner, Ontario, Canada as its slide Part No. 182-234, or some other suitable equivalent antifriction slide type mounting assembly.

The rear casing at the portion of its side walls 164 and 166 to be aligned with fabricated member 112 (see FIG. 4) is provided with a button type glide member 205, formed from nylon or the like, to avoid marring the surfacing 32 of member 112 when applying and removing the carriage 44 with respect to the desk 10.

The front casing 48 comprises a housing or shell 210 defining a top wall 212 having a downwardly indented center floor portion 214, side walls 216 and 218, depending rear wall 220 (see FIG. 4), and forward wall structure 222 that is shaped to define the beveled edge surfacing 49, and upright front end wall 224, as well as elongated indentation or notch 226 that forms a hand hold 228 for the desk user working in front of the desk 10 to grasp the front casing 48 and move it as needed toward and away from the rear casing 46 to adjust the CRT 64 or its equivalent that is carried by the carriage 44 to the user's convenience in viewing same, as when the computer keyboard 38 is in use.

The shell or housing 210 is open as at 230 on its underside (see FIG. 4) and has applied to the indented shell portion 214 on its underside a mounting plate 232 that defines depending flanges 234 on either side of same that extend forwardly and rearwardly of the desk. Mounted on top of the shell indented portion 14 is the base plate 236 of swivel assembly 238 that preferably is of the commercially available unit offered by the Waterloo Metal Stamping Ltd. Company that is identified hereinbefore as that company's swivel part No. 182-275.

The plate 232, which mounts the channel members 201 of the indicated commercially available antifriction slide assemblies 50 and 52 to the front casing 48, and base plate 236 are conveniently secured in place by suitable fasteners 240 that clamp these members to either side of the front casing indented floor portion 214 in the manner indicated in FIG. 4.

The front casing 48 is formed along its rear wall 220 with windows 241 opposing the rear casing windows 192 and 194 through which the C section members 201 of the respective assemblies 50 and 52 pass, with their ends inside the casing 48 being suitably affixed to the respective flanges 234 of the mounting plate 232, as by employing suitable fasteners 244.

The respective slide assemblies 50 and 52 are each equipped with an antifriction bearing ball equipped separate sled forming member (not shown) that connects the respective rigid members 200 and 201 of the respective assemblies 50 together for smooth telescoping movement, whereby the front and rear casings 46 and 48, when assembled together as indicated, are mounted for movement toward each other (the limit of which is when the end wall 220 of casing 48 is in substantial engagement with the forward wall 170 of the casing 46); movement of the respective casings 46 and 48 in the opposite direction is likewise accommodated, to the extent, for the application of the devices 50 and 52 as shown, indicated by the phantom positions of the carriage 44 shown in FIG. 3. Other forms of telescoping slide support devices of any conventional make may be employed to serve the functions of conventional assemblies 50 and 52.

The swivel unit 238 also includes upper swivel plate 248 that in the commercial assembly 238 are joined together at the centers 237 and 249 of the of these plates by a suitable rivet structure (not shown). Base plate 236 is conventionally formed with a circular raceway 250 in which a number of bearing balls 252 are applied, and swivel plate 248 defines a similar raceway (not shown) that opens downwardly when plates 236 and 248 are secured together at their centers 237 and 249 (by suitable riveting in the commercial unit), with the swivel unit 238 being assembled so that the upper plate 248 is biased against the ball bearings 252 (that ride within the raceway of plate 248), which are thus biased against the base plate 236 (in the assembled relation of unit 238). Thus, the indicated raceways of the plates 236 and 248 are in concentric, congruent relation about the axial centers of the respective plates 236 and 248, with bearing balls 252 riding therein. The plates 236 and 248 are preferably provided with cooperating bumpers 260 and 261, one of which is shown at 260 on plate 236 in FIG. 5, to prevent the swivel unit 238 from being swung more than 360 degrees (for instance, limit the pivotal movement to approximately 355 degrees) about pivot axis 55 of the turntable assembly 54 (to avoid winding up of the CRT connecting cable on turntable assembly 54 by excess rotation thereof).

As indicated in FIG. 5, the swivel plate 248 adjacent each of its corners is provided with an upstanding stud 262 that may be conveniently provided by applying conventional weld nuts 263 to plate 248 at the corner locations indicated, utilizing suitable spot welding techniques. In any event, the respective studs 262 have applied to same the respective arms 56, 58, 60, and 62, in the manner suggested in the drawings, with the top plate 264 of the turntable assembly 54 being secured to the respective threaded bores 265 defined by the weld nuts forming studs 262 by suitable Allen head type screw connectors 266, with the securement involved being such that the indicated turntable assembly arms 56, 58, 60 and 62 are securely clamped between the plates 248 and 264.

The respective arms 56, 58, 60, and 62 are of identical structure, and as indicated in FIGS. 4 and 5, they each comprise an elongate member 270 of suitable metallic composition defining planar upper and lower surfaces 272 and 274, an elongate adjustment aperture 276 at their respective ends 278 that extends through the respective arms, and an internally threaded aperture 280 at their respective ends 282. Each arm threaded aperture 280 threadedly receives the threaded shank 283 of the leveler disc 284 that is suitably fixed to its shank 287, and has its upper surfacing 284 indented to receive a cushioning disc 286 formed from a suitable foam material that is suitably bonded to the leveler disc 284.

The respective arms 56, 58, 60, and 62 as applied to the turntable assembly 54 have their respective apertures 276 received over the studs 262, with the ends 278 of the respective arms being directed generally toward the pivot axis 55 of the turntable assembly 54, and the other ends 282 of the respective arms being outwardly directed, as indicated in FIGS. 1-3. Loosening of the threaded connectors 266 permits the respective arms 56, 58, 60, and 62 to be moved inwardly or outwardly to adjust the respective arms inwardly or outwardly so that their cushions 286 will all support a CRT unit or the like, with the leveler discs 284 being threaded relative to the respective arms as needed to support the CRT unit or the like on same substantially level and without tilting. The threaded connectors 266 are then tightened down in place to firmly clamp the respective arms between the plates 264 and 248, and specifically clamp the plates 264 and 248 against the respective arm surfaces 270 and 274, to hold such arms in adjusted position.

Assuming a desk 10 is provided having the desk top 214 arranged as indicated, the carriage 44 may be applied thereto by bringing the front and rear casings 46 and 48 into juxtaposition, as by the installer using one hand applied through hand hold forming aperture 190 of the rear casing, and the other hand grasping the rear casing depending lug portion 172 at its exterior 182 with the fingers of that hand reaching into the underside of same as needed; the installer in installing the carriage 44 maneuvers the carriage 44 to first apply the rollers of the respective sets of rollers 178 and 180 to the desk top rollerway 118, and then rest the rollers 188 of the respective roller sets 184 and 186 on the rollerway 136. The wiring connection for the CRT or other equivalent visual read out mechanism is then brought through the rear casing aperture 190 and suitably connected to the CRT or the like using conventional wiring techniques.

Assuming that the computer keyboard 38 is also electrically connected conventionally to the wiring of trough 36 that is in turn conventionally connected to a computer terminal or the like, the user of the desk when using the computer keyboard 38 may pivot it out from under the desk top 14 and adjust the CRT unit 64 or its equivalent over the desk top work spacing 26 and in a position to be in for viewing by the desk user, with exemplary positions being indicated by the showing of FIG. 3. Thus, the carriage 44 may be moved the length of the desk along the trackway 30 with the front casing 48 adjacent the rear casing 46 or pulled forwardly thereof, as desired by the desk user, and over the desk work surfacing 26, with the turntable assembly 54 also being pivotable about its axis 55 to angle the CRT unit 64 or its equivalent) as desired by the desk user, relative to the carriage front casing 48 (one condition of adjustment of this type is shown in FIG. 3). To effect this adjustment, the desk user need only grasp one of the outwardly extending arms of the turntable assembly 54, such as one of the arms 58 or 60 in the showing of FIG. 3, to effect the pivoting action of the turntable assembly that is desired.

Should it become desirable to remove the carriage 44 from the desk top 14, after the CRT unit or its equivalent has been disconnected and removed from the turntable assembly 54, the desk user or some other person can remove the carriage by himself by reversing the application procedure previously described for applying the carriage 44 to the desk top 14. This involves first placing the front casing 48 in substantial abutting relation with the rear casing 46, and then placing one hand within hand hold opening 190 and the other hand on the exterior of the rear casing depending lug structure 172, with his fingers of that hand reaching into the underside of same as needed, then tilting the carriage 44 to the right of FIGS. 4 and 2 to lift the rollers of the roller sets 184 and 186 free from the rollerway 136, and then shifting the carriage 44 downwardly as needed to remove the roller sets 178 and 180 from the rollerway 114, after which the carriage can be shifted to the right of FIG. 4 to free it entirely from the desk top 14.

It will thus be seen that the desk 10 has its top 14 and carriage 44 therefor delineated to maximize the work surfacing 26 along the length and width of the desk top, while providing a trackway 30 for cantilever mounting on the rear of the desk the carriage 44 that is arranged to support a CRT assembly or its equivalent by merely resting same on the turntable assembly 54 thereof, with the carriage front casing and its turntable assembly being disposed above and positioned for movement along and over the maximized work surfacing 26, from one end of the desk top to the other. Not only is the CRT unit or its equivalent fully adjustable positionwise, by the desk user, forwardly and rearwardly of the desk top, but the CRT device or its equivalent may be pivotally adjusted about the turntable pivot axis 55 to suit the desk user's convenience, regardless of where he may be positioned along the length of the front side of the desk. The application of the computer keyboard 38 underneath the desk top for movement to the outwardly disposed work position of FIG. 1 from an inwardly disposed retracted position illustrated by the phantom showing of FIG. 4 keeps the computer keyboard available for use when needed, but serves as another means for freeing up the work spacing 26 for full use by the desk user.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In an office furniture desk including a generally flat desk top and leg means for supporting same from a floor in a substantially horizontal position, with the desk top having oppositely disposed front and rear portions extending between right and left hand side portions on either side of the desk top, the improvement wherein:
the desk top defines along its front portion a wide and flat upwardly facing work surfacing that extends between its side portions and rearwardly of the desk top toward the desk top rear portion a major proportion of the desk top width, and
the desk top defines along its rear portion a narrow trackway that extends between the desk top side portions with the trackway having its upper surfacing in substantially coplanar relation with said work surfacing,
said improvement further including:
a carriage riding on said trackway for movement the length thereof,
said carriage comprising a rear casing member rollably mounted on said trackway and a front casing member carried by said rear casing member in overhanging relation to said work surfacing,
means for mounting said front casing on said rear casing for rectilinear movement forwardly and rearward of said work surfacing with respect to said rear casing,
said front casing including a turntable assembly defining a rotatable platform structure on which read out equipment may be rested on said carriage against gravity,
said turntable assembly comprising:
a swivel mechanism secured to said front casing member defining a pivot axis that is disposed substantially normally of the desk top work surfacing,
said swivel mechanism defining an upper plate member pivotable about said axis,
a plurality of rectilinear arms carried by said plate member and disposed to extend substantially radially of said axis and having like ends of same projecting laterally outwardly of said turntable assembly,
a cover member overlying the other ends of said arms, and
means for releasably clamping said arm other ends between said cover member and said plate member,
said arms at the respective like ends each carrying a load support disc for receiving the read out equipment to be rested on said carriage.

2. The improvement set forth in claim 1 wherein:
said load support discs of said arms include means for adjusting the level of same.

3. The improvement set forth in claim 1 wherein:
said releasable clamping means includes means for adjusting said arms toward and away from said axis when said releasable clamping means is released for adjusting the position of said support discs toward and away from said axis.

4. In an office furniture desk including a generally flat desk top and leg means for supporting same from a floor in a substantially horizontal position, with the desk top having oppositely disposed front and rear portions extending between right and left hand side portions on either side of the desk top, the improvement wherein:
the desk top defines along its front portion a wide and flat upwardly facing work surfacing that extends between its side portions and rearwardly of the desk top toward the desk top rear portion a major proportion of the desk top width, and
the desk top defines along its rear portion a narrow trackway that extends between the desk top side portions with the trackway having its upper surfacing in substantially coplanar relation with said work surfacing,
said improvement further including:
a carriage riding on said trackway for movement the length thereof,
said carriage comprising a rear casing member rollably mounted on said trackway and a front casing member carried by said rear casing member in overhanging relation to said work surfacing,
means for mounting said front casing on said rear casing for rectilinear movement forwardly and rearward of said work surfacing with respect to said rear casing,
said front casing including a turntable assembly defining a rotatable platform structure on which read out equipment may be rested on said carriage against gravity,
said work surfacing and said trackway extending rectilinearly of the desk top between said side portions of same,
with said carriage being cantilever mounted on said trackway from the desk top rear portion,
said trackway being formed to define therealong a rectilinear aperture, and
including a trough mounted on the desk top below said trackway for receiving electrical wiring,
said aperture opening into said trough for defining a wire passage for wiring connection from the trough to equipment that is to rest on said turntable assembly,
said trackway comprising:
a first rectilinear rollerway disposed along the desk top rear portion underside,
a second rectilinear rollerway disposed along the desk top forwardly of but adjacent, said aperture,
said rollerways and said aperture being substantially coextensive longitudinally of the desk top,
said rear casing journalling a set of first rollers riding on said first rollerway,
with said rear casing further journalling a set of second rollers riding on said second rollerway.

5. The improvement set forth in claim 4 wherein:
said trackway rearwardly of said aperture defines a cover for said trough,
and including means for hingedly mounting said cover to swing upwardly to open said trough when said carriage is to one side of said cover.

* * * * *